April 10, 1928.  1,665,451
L. G. GATES
APPARATUS FOR LUBRICATING WIRE CABLES
Filed Feb. 9, 1926   2 Sheets-Sheet 1
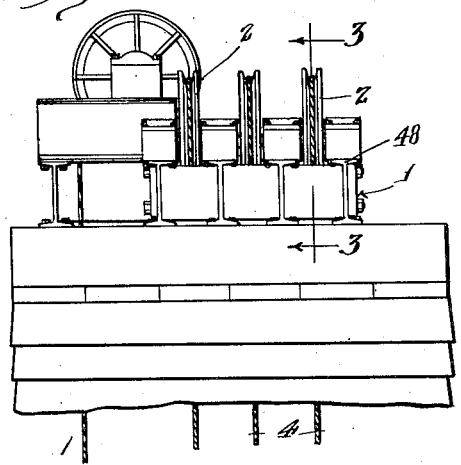
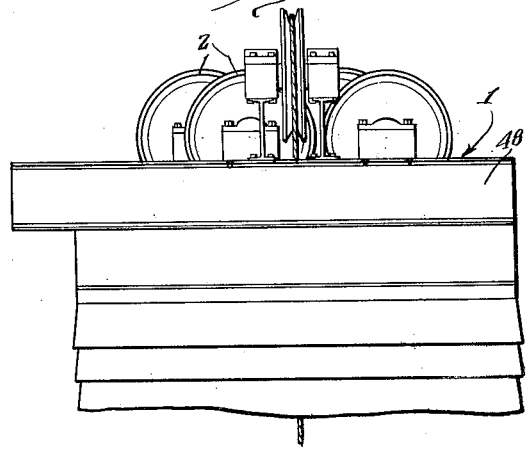
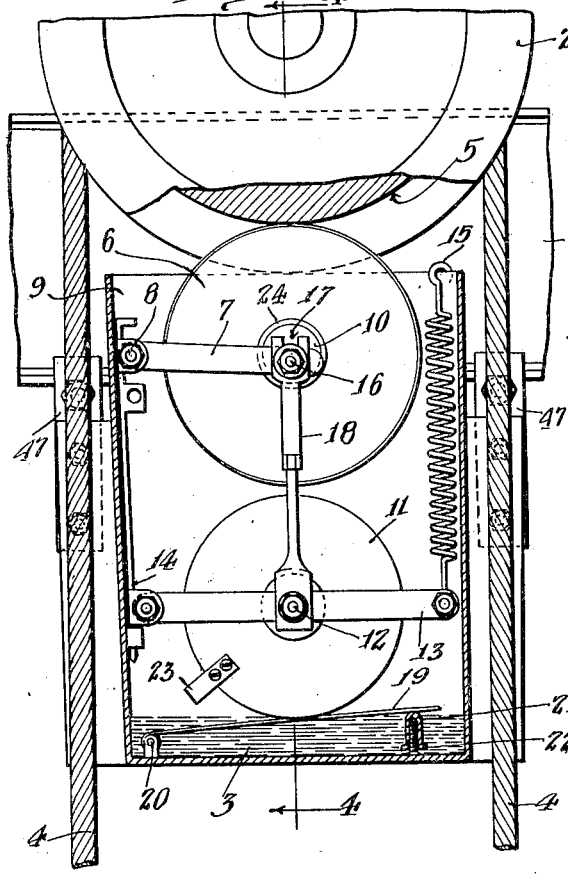
Inventor
Leroy G. Gates
By Lyon & Lyon
Attorneys April 10, 1928.                                                              1,665,451
L. G. GATES
APPARATUS FOR LUBRICATING WIRE CABLES
Filed Feb. 9, 1926                      2 Sheets-Sheet 2
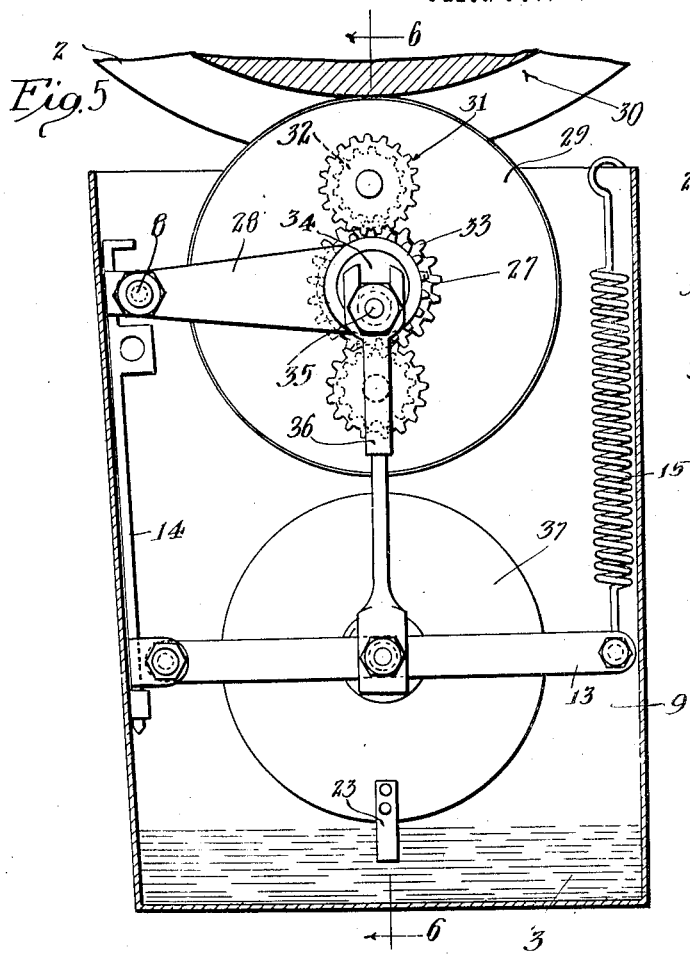
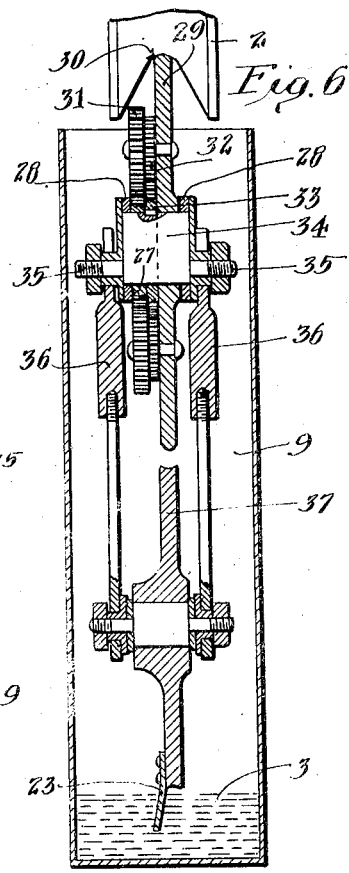

Patented Apr. 10, 1928.

1,665,451

UNITED STATES PATENT OFFICE.

LEROY G. GATES, OF BAKERSFIELD, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

APPARATUS FOR LUBRICATING WIRE CABLES.

Application filed February 9, 1926. Serial No. 87,037.

This invention relates to a method and apparatus for lubricating wire ropes or cables, such as used in hoisting mechanisms, and while the invention is applicable to the use of cables running over drums or sheaves for any purpose, it is especially useful when applied to the lubrication of wire ropes used for supporting the blocks of oil wells. It is necessary to lubricate such cables in order to reduce the friction of the strands of the cable on each other as they pass around the sheaves or drums, and also to protect the metal from rusting. The lubrication also serves to reduce the wear on the sheaves.

It has been attempted to apply a lubricant directly to the wire rope by means of brushes or other means, but in practice it was found difficult to accomplish this without applying an excessive amount of the lubricant to the rope. With that method it was also difficult to apply the lubricant to the inner side of the rope and when applied to the outer side the best possible effects from the lubricant could not be obtained. Furthermore, the centrifugal force on high speed cables would tend to throw off a portion of the oil used as a lubricant.

The general object of the invention is to provide apparatus which will overcome these difficulties and which will provide simple means for accomplishing the effective lubrication of such a rope; also to provide simple means for enabling the lubricant to be fed in relatively small quantities but regularly to the rope, and to provide means for insuring that the lubricant will be applied to the inner side of the rope.

Further objects of the invention will appear hereinafter.

The invention in my apparatus consists in the novel parts and combination of parts to be described hereinafter, all of which contribute to produce an efficient lubricating apparatus for wire ropes or the like.

A preferred embodiment of the invention is described in the following specification, while the broad scope of the invention is pointed out in the appended claims.

In practicing my method, I apply a lubricant to the exposed face of the sheave or drum at a point between the runs of the rope which passes around the drum. Usually the rope passes around a sheave which has a groove to receive the rope; in practicing my invention. I prefer to apply the lubricant at the bottom of the groove so that when the rope passes onto the sheave, the lubricant will be transferred to its inner side by reason of its contact with the sheave. Furthermore, the centrifugal force acting on the lubricant tends to work the lubricant out through the strands of the rope and also tends to advance the lubricant up the sides of the groove so that it will be applied throughout the entire area of the inner face of the rope.

In order to effect the application of the lubricant to the rope, I prefer to employ a wheel which is located near the exposed face of the sheave and between the runs of the rope. I hold this wheel against the face of the sheave and apply a lubricant to the edge of the wheel so that this lubricant becomes transferred to the sheave. This may be accomplished in a very simple manner by providing a bath of lubricant between the runs of the rope below the sheave, and reciprocating the wheel in the space between the bath and the sheave so as to alternately dip the wheel or a portion of the wheel in the bath, and bring the edge of the wheel toward the sheave to effect the transfer of the lubricant. The appartus which I prefer to use for carrying out this method therefore includes a lubricant supply and transfer mechanism located between the runs of the rope with means for actuating the transfer mechanism to effect the transfer of the lubricant from the supply to the face of the sheave.

The apparatus may be embodied in a variety of forms. Wherever the invention is employed, however, I prefer to apply the lubricant to the fastest moving sheave over which the rope runs because the length of rope running over the sheave is greatest.

In the drawing:—

Figure 1 is a side elevation of a crown block, the upper portion of the derrick being broken away, and illustrating the sheaves and cables of an oil derrick to which my invention is applied.

Fig. 2 is a side elevation similar to Fig. 1 but showing another side of the apparatus.

Fig. 3 is a vertical section upon an enlarged scale taken about on the line 3—3 of Fig. 1, certain parts being broken away, and passing through my lubricating apparatus.

Fig. 4 is a vertical section taken about on the line 4—4 of Fig. 3, but representing the lower wheel in a different position from that in which it is represented in Fig. 3.

Fig. 5 is a vertical section similar to Fig. 3, but showing another embodiment of the invention.

Fig. 6 is a section taken about on the line 6—6 of Fig. 5.

Referring to Figs. 1 to 4, 1 represents the crown block carrying sheaves 2. To the highest speed sheave of the group, for example, the right hand sheave, I apply the apparatus shown in Figs. 3 and 4. This apparatus includes a holder for a supply of lubricant, for example, a bath 3 of oil, which is located between the runs 4 of the cable which passes around the sheave. I provide transfer mechanism for transferring the lubricant periodically to the bottom of the groove 5 of the sheave, in which the rope lies. This transfer mechanism may be of any suitable construction and when in operation takes small quantities of lubricant from the lubricant supply and transfers them to the bottom of the groove 5. In the present instance I construct the transfer mechanism so that it may reciprocate or oscillate toward the lubricant supply and toward the sheave. At one extreme of its movement, the transfer mechanism takes up the lubricant and at the other extreme of its movement it transfers the lubricant to the face of the sheave. Any suitable means may be employed for developing this oscillating or reciprocating movement. In the present instance I employ a wheel 6 and provide means for supporting the same to rotate substantially in the plane of the sheave, so that this wheel is rotated continuously. The rotation of this wheel 6 provides the movement which effects the reciprocation or oscillation to feed the lubricant onto the sheave. For this purpose the wheel 6 is supported between two arms 7 which are pivoted at 8 to the side of the casing or box 9, the lower portion of which carries the bath 3 of the lubricant. The hub of the wheel 6 is provided with an eccentric device 10 which controls the action of a daubing device between the wheel 6 and the lubricant supply 3. This daubing device is preferably in the form of a wheel 11, the lower edge of which may touch or pass near the upper face of the lubricant. This wheel is supported on a pivot pin 12 between two arms 13 which are pivotally supported on a bracket 14 at the side of the casing 9. Any suitable means such as a coil spring 15 is provided which exerts its force to draw the daubing wheel 11 toward the wheel 6. When the wheel 11 is in contact with the edge of the wheel 6, it will transfer any lubricant carried on it to the wheel 6, which in turn transfers the lubricant to the groove 5 of the sheave.

The eccentric device 10 includes an eccentric pin 16 which is eccentric with respect to the axis of rotation of the wheel, and every time this pin rotates downwardly it strikes the lower end of a notch 17 in the upper end of a connecting rod 18, which is preferably adjustable and the lower end of which is attached to the pin 12. In this way, at each revolution, the pin 16 "kicks" the arms 13 downwardly a sufficient distance to enable the daubing wheel 11 to come in contact with the lubricant. In practice I may duplicate this connecting rod construction and eccentric pin on each side of the wheel. (See Fig. 4). But when the pin 16 is in the upper portion of its travel it permits the spring 15 to hold the wheel 11 against the wheel 6.

As the sheave 2 will drive the wheel 6 at a high speed, the wheel 11 will also be driven at a high speed whenever it touches the wheel 6. In order to "dampen" this wheel or stop its rotation after the transferring mechanism has effected the transfer of the lubricant, I prefer to provide a small brake bar 19 which may be a slightly concave bar pivoted at 20 and supported on an adjustable post 21 at its outer end. The post 21 may consist of a threaded stud with a sleeve fitting over it and provided with a small nut 22. By screwing the nut 22 up on the threaded post, the contact of the bar with the wheel can be regulated.

Where it is desired to transfer only a very small quantity of the lubricant, I do not permit the edge of the wheel 11 to come into the bath but I provide a wiper 23 which may be in the form of a small plate attached to the side face of the wheel, and the lower end of this wiper dips into the bath at each revolution and the lubricant on it spreads to the wheel 11 and is transferred to the edge of the wheel 6.

In whatever way the eccentric pin 16 is driven, I provide a construction which will insure that the application of the dauber or dauber wheel 11 to the wheel 6 will not occur at the same point on the periphery of the wheel 6. If that occurred it would eventually wear a flat place on this wheel and that would be undesirable. In the present instance, in order to enable the point of contact to shift around the edge of the wheel 6, I mount the eccentric pin 16 so that it can be adjusted around the axis of the wheel 6. For this purpose, the wheel has a hub 24 concentric with the two pins 16 and this hub is rigidly secured within an eccentric bushing 25, said eccentric bushing being secured in any desired position by means of a set screw 26. After using the apparatus with the bushing 25 in a certain position for a short time, the set screw should be loosened and the bushing with the hub 24 rotated through a small angle. This will shift the point of contact with the wheel 6 to a new place on the periphery.

In the embodiment of the invention shown in Figs 5 and 6, the reciprocating movement of the transfer mechanism is accomplished by gearing. Any suitable arrangement of gearing may be provided for this purpose. In the present instance I provide a gear wheel 27 which is fixed to one of the arms 28 that correspond to the arms 7. The wheel 29 which rolls on the bottom of the groove 30 of the sheave carries two planetary gear wheels 31 which roll on the periphery of the gear 27, and each of these gear wheels 31 carries a rigid pinion 32. These pinions mesh with a gear wheel or gear ring 33 which is rigid on a hub 34. This hub at its ends carries eccentric pins 35, respectively. These pins are connected to the upper ends of adjustable connecting rods 36 which are reciprocated at each revolution of the pins 35 to oscillate a dauber wheel 37 which is supported and operates in the same way as the dauber wheel 11 already described. The proportioning of the gears and pinions should be such that the arc of movement of the hub 34 in rotating will not be commensurate with the arc of movement of the wheel 29 which produces the rotation of the hub 34. By doing this, the point of contact on the wheel 29 will move progressively around the periphery of the wheel.

The lubricating apparatus may be secured in any desired manner. In Fig. 4, it is illustrated as being secured by means of two hook-plates 47 which engage the inner flanges of I-beams 48, and which have bolts 49 which extend outwardly under the flanges and carry toe plates 50 which are fastened against the outer flange by nuts 51.

It is understood that the embodiment of the invention described herein is only one of the many embodiments this invention may take, and I do not wish to be limited to the practice of the invention, nor in the claims, to the particular embodiment set forth.

What I claim is:—

1. In apparatus for lubricating a wire rope passing around a drum or sheave, with runs hanging from its opposite sides, the combination of a lubricant holder, transfer mechanism located between the runs of the rope, and means for periodically moving the transfer mechanism to effect periodically the transfer of lubricant from the holder to the face of the sheave between the runs of the rope.

2. In apparatus for lubricating a wire rope passing around a drum or sheave, with runs hanging from its opposite sides, the combination of a lubricant holder, transfer mechanism located between the runs of the rope and including a wheel mounted to rotate in substantially the plane of the sheave, and means for actuating the transfer mechanism to apply lubricant from the lubricant holder to the edge of the wheel and from the edge of the wheel to the face of the sheave between the runs of the rope.

3. In apparatus for lubricating a wire rope passing around a drum or sheave, with runs hanging from its opposite sides, the combination of a lubricant holder, transfer mechanism located between the runs of the rope and including a wheel mounted to rotate in substantially the plane of the sheave, means for periodically actuating the transfer mechanism to apply a lubricant from the lubricant holder to the edge of the wheel and from the edge of the wheel to the face of the sheave between the runs of the rope, and means for stopping the rotation of the wheel after the transfer of lubricant.

4. In apparatus for lubricating a wire rope passing around a drum or sheave, with runs hanging from its opposite sides, the combination of a wheel, means for supporting the same to rotate in substantially the same plane as the sheave, means for periodically applying a lubricant to the edge of the wheel, and means for holding the edge of the wheel against the exposed face of the sheave between the runs of the rope.

5. In apparatus for lubricating a wire rope passing around a drum or sheave, with runs hanging from its opposite sides, the combination of a wheel, means for supporting the same to rotate in substantially the plane of the sheave between the runs of the rope, automatic means for moving the wheel away from the sheave and toward the sheave, and means for applying lubricant to the edge of the wheel.

6. In apparatus for lubricating a wire rope passing around a drum or sheave, with runs hanging from its opposite sides, the combination of a wheel, means for supporting the same to rotate in substantially the plane of the sheave between the runs of the rope, automatic means for reciprocating the wheel to move the same away from the wheel and toward the wheel, and means for applying a lubricant to the edge of the wheel remote from the sheave.

7. In apparatus for lubricating a wire rope passing around a drum or sheave, with runs hanging from its opposite sides, the combination of a wheel, means for supporting the same to rotate in substantially the same plane as the sheave and in the space between the runs of the rope, means for supporting a supply of lubricant adjacent the edge of the wheel remote from the sheave, automatic means for reciprocating the wheel away from the sheave and toward the face of the sheave, said lubricant supply being located in a position to transfer lubricant to the edge of the wheel when the wheel is reciprocated away from the sheave.

8. In apparatus for lubricating a wire rope passing around a drum or sheave, with runs hanging from its opposite sides, the combination of a wheel, means for supporting the same to rotate in substantially the same plane as the sheave and in the space between the runs of the rope, means for supporting a supply of lubricant adjacent the edge of the wheel remote from the edge, means actuated by the sheave for reciprocating the wheel away from the sheave and toward the face of the sheave, said lubricant supply being located in a position to transfer lubricant to the edge of the wheel when the wheel is reciprocated away from the sheave.

9. In apparatus for lubricating a wire rope passing around a drum or sheave, with runs hanging from its opposite sides, the combination of a wheel, means for supporting the same to rotate in substantially the plane of the sheave, means for holding the wheel against the face of the sheave between the runs of the rope, a second wheel, means for supporting the same to rotate in substantially the same plane as the wheel, means actuated by the first named wheel for reciprocating the last named wheel to move the same away from the first named wheel and toward the face of the first named wheel, and means for applying lubricant to the second named wheel.

10. In apparatus for lubricating a wire rope passing around a drum or sheave, with runs hanging from its opposite sides, the combination of a wheel, means for supporting the same to rotate in substantially the same plane as the sheave and in contact with the face of the sheave between the runs of the rope, means for supporting a lubricant supply, a second wheel mounted to rotate in substantially the plane of the first named wheel and between it and the lubricant supply, and means for reciprocating the last named wheel to move the edge thereof toward the lubricant supply to apply lubricant to the second named wheel and to bring the edge of the second named wheel into contact with the first named wheel.

11. In apparatus for lubricating a wire rope passing around a drum or sheave, with runs hanging from its opposite sides, the combination of a wheel, means for supporting the same to rotate in substantially the same plane as the sheave and in contact with the face of the sheave between the runs of the rope, means for supporting a lubricant supply, a second wheel mounted to rotate in substantially the plane of the first named wheel and between it and the lubricant supply, a wiper carried by the second named wheel, and means for reciprocating the second named wheel to move the wiper into contact with the lubricant supply and to bring the second wheel into contact with the first named wheel to transfer the lubricant thereto.

12. In apparatus for lubricating a wire rope passing around a drum or sheave, with runs hanging from its opposite sides, the combination of a wheel, means for supporting the same to rotate in substantially the same plane as the sheave and in contact with the face of the sheave between the runs of the rope, a lubricant supply, daubing means for transferring lubricant from the lubricating supply to the wheel, and automatic means for oscillating the daubing means to effect the transfer of the lubricant.

13. In apparatus for lubricating a wire rope passing around a drum or sheave, with runs hanging from its opposite sides, the combination of a lubricant supply, a wheel, means for supporting the same to rotate in substantially the plane of the sheave, means for holding the wheel in contact with the face of the sheave between the runs of the rope, an eccentric device carried by the wheel, and an oscillating dauber device actuated by the eccentric device mounted to touch the lubricant supply and applying lubricant to the edge of the wheel.

14. In apparatus for lubricating a wire rope passing around a drum or sheave, with runs hanging from its opposite sides, the combination of a lubricant supply, a wheel, means for supporting the same to rotate in substantially the plane of the sheave, means for holding the wheel in contact with the face of the sheave between the runs of the rope, an eccentric device carried by the wheel, and an oscillating dauber device including a dauber wheel mounted to touch the lubricant supply and apply the lubricant to the edge of the first named wheel.

15. In apparatus for lubricating a wire rope passing around a drum or sheave, with runs hanging from its opposite sides, the combination of a lubricant supply, a wheel, means for supporting the same to rotate in substantially the plane of the sheave, means for holding the same in contact with the face of the sheave between the runs of the rope, a driving pin mounted eccentrically on the wheel, an oscillating dauber device actuated by the eccentric pin and mounted so as to touch the lubricant supply and apply lubricant to the edge of the wheel, and means enabling the position of the eccentric pin to be adjusted to shift the point of contact of the oscillating dauber device to different parts of the face of the wheel.

16. In apparatus for lubricating a wire rope passing around a drum or sheave, with runs hanging from its opposite sides, the combination of a lubricant supply, a wheel, means for supporting the same to rotate in substantially the plane of the sheave, means for holding the wheel in contact with the face of the sheave between the runs of the rope, an eccentric device carried by the wheel, an oscillating dauber device actuated by the eccentric device mounted to touch the lubricant supply and apply lubricant to the edge of the wheel, and means for driving the eccentric device from the wheel capable of shifting the point of contact of the dauber with the edge of the wheel.

17. In apparatus for lubricating a wire rope passing around a drum or sheave, with runs hanging from its opposite sides, the combination of a wheel, means for supporting the same to rotate substantially in the same plane as the sheave and in contact with the face of the sheave between the runs of the rope, a lubricant supply, a second wheel mounted to rotate in substantially the plane of the first named wheel and between it and the lubricant supply, an eccentric pin associated with the hub of the first named wheel, gear wheels for driving the eccentric pin from the first named wheel, and a connection from the eccentric pin to the second named wheel to move the edge thereof toward the lubricant supply to apply lubricant to the second named wheel and to bring the edge of the same into contact with the first named wheel.

18. In apparatus for lubricating wire rope passing around a drum or sheave, with runs hanging from its opposite sides, the combination of a wheel, means for supporting the same to rotate substantially in the same plane as the sheave and in contact with the face of the sheave between the runs of the rope, a lubricant supply, a second wheel mounted to rotate in substantially the plane of the first named wheel and between it and the lubricant supply, an eccentric pin associated with the hub of the first named wheel, gear wheels including a fixed gear and planetary gears for driving the eccentric pin from the first named wheel, and a connection from the eccentric pin to the second named wheel to move the edge thereof toward the lubricant supply to apply lubricant to the second named wheel and to bring the edge of the same into contact with the first named wheel.

Signed at Bakersfield, Cal., this 22d day of January, 1926.

LEROY G. GATES.